(12) United States Patent
Parkvall et al.

(10) Patent No.: US 10,701,682 B2
(45) Date of Patent: Jun. 30, 2020

(54) SIGNALING RADIO TRANSMISSION MAPPING TYPES

(71) Applicant: Telefonaktiebolaget LM Ericsson (publ), Stockholm (SE)

(72) Inventors: Stefan Parkvall, Bromma (SE); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/441,216

(22) Filed: Jun. 14, 2019

(65) Prior Publication Data

US 2019/0364544 A1 Nov. 28, 2019

Related U.S. Application Data

(63) Continuation of application No. 16/274,531, filed on Feb. 13, 2019, now abandoned, which is a continuation of application No. PCT/SE2018/051208, filed on Nov. 23, 2018.

(60) Provisional application No. 62/590,466, filed on Nov. 24, 2017.

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0044* (2013.01); *H04L 5/0048* (2013.01); *H04W 72/044* (2013.01)

(58) Field of Classification Search
CPC ... H04L 5/0048; H04L 5/0057; H04L 1/0026; H04L 5/00; H04L 1/00; H04W 72/1273; H04W 52/42; H04W 72/0473; H04W 72/04; H04W 72/12; H04B 7/0456
USPC .................................................. 370/330
See application file for complete search history.

(56) References Cited

U.S. PATENT DOCUMENTS

| | | | | |
|---|---|---|---|---|
| 9,907,067 | B2* | 2/2018 | Park .................. | H04W 72/0446 |
| 10,164,748 | B2* | 12/2018 | Li ......................... | H04L 5/0048 |
| 10,405,266 | B2* | 9/2019 | You ...................... | H04W 48/12 |
| 2016/0323895 | A1* | 11/2016 | Pourahmadi ........... | H04L 27/26 |

(Continued)

OTHER PUBLICATIONS

3GPP TSG RAN WG1 Meeting 90bis; Prague, Czech Republic; Source: Huawei, Ericsson, AT&T, Nokia; Title: On slot-based and non-slot-based scheduling (R1-1718874)—Oct. 9-13, 2017.

(Continued)

*Primary Examiner* — Man U Phan
(74) *Attorney, Agent, or Firm* — Baker Botts, LLP

(57) ABSTRACT

According to some embodiments, a wireless device is configured to receive resource allocation information from a network node. The wireless device comprises a radio interface and processing circuitry configured to receive radio resource allocation information for a wireless transmission. The radio resource allocation information comprises one or more time-domain resources for the wireless transmission and a mapping type for the wireless transmission. The mapping type refers to a reference signal placement within the wireless transmission (e.g., demodulation reference signal (DMRS) mapping Type A or Type B). The radio interface and processing circuitry are further configured to interpret the received radio resource allocation information to determine a mapping type for the wireless transmission.

27 Claims, 8 Drawing Sheets

(56) References Cited

U.S. PATENT DOCUMENTS

| | | | |
|---|---|---|---|
| 2018/0026684 A1* | 1/2018 | Wei | H04L 25/0242 |
| | | | 370/329 |
| 2018/0278391 A1* | 9/2018 | Zhang | H04L 5/00 |
| 2018/0316534 A1* | 11/2018 | Shin | H04L 27/2602 |
| 2018/0331727 A1* | 11/2018 | John Wilson | H04B 7/0413 |
| 2019/0082427 A1* | 3/2019 | Kim | H04L 5/0053 |
| 2019/0182829 A1* | 6/2019 | Choi | H04W 72/0446 |
| 2019/0268889 A1* | 8/2019 | Kim | H04W 76/27 |
| 2019/0288816 A1* | 9/2019 | Ren | H04L 27/2611 |

OTHER PUBLICATIONS

3GPP TSG RAN WG1 Meeting 91; Reno, USA; Source: AT&T; Title: On DCI contents and formats (R1-1719643)—Nov. 27-Dec. 1, 2017.

PCT Notification of Transmittal of the International Search Report and the Written Opinion of the International Searching Authority, or the Declaration for International application No. PCT/SE2018/051208—dated Feb. 12, 2019.

* cited by examiner

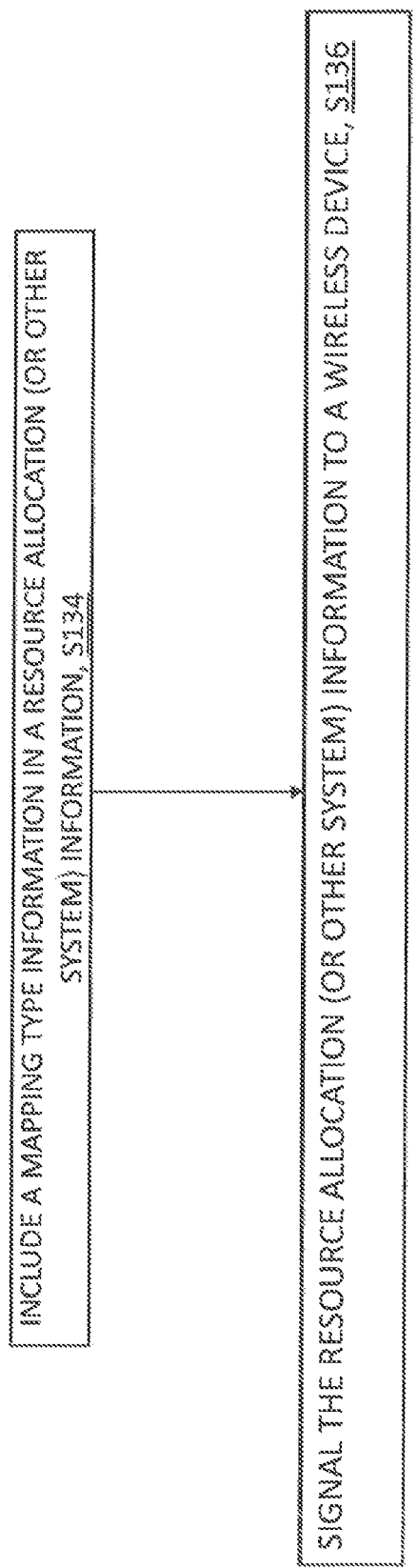

SIGNALING RADIO TRANSMISSION MAPPING TYPES

PRIORITY

This application is a continuation, under 35 U.S.C. § 120 of U.S. Utility patent application Ser. No. 16/274,531 which is a continuation, under 35 U.S.C. § 120 of International Patent Application Serial No. PCT/SE2018/051208 filed Nov. 23, 2018 and entitled "SIGNALING RADIO TRANSMISSION MAPPING TYPES" which claims priority to U.S. Provisional Patent Application No. 62/590,466 filed Nov. 24, 2017 both of which are hereby incorporated by reference in their entirety.

TECHNICAL FIELD

Embodiments of the present disclosure are directed to wireless communications and, more particularly, to methods and apparatus for signaling mapping type information, such as physical downlink shared channel (PDSCH) mapping type A or type B.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Third generation Partnership Project (3GPP) fifth generation (5G) systems (e.g., new radio (NR)), may use one or more mapping types for uplink and downlink radio transmissions. An example of mapping type information is information indicating whether physical downlink shared channel (PDSCH) is mapping type A or mapping type B.

While certain embodiments are described with respect to PDSCH mapping types A and B, particular embodiments may apply to other mapping type information and other mapping types, such as mapping types for uplink communication, such as physical uplink shared channel (PUSCH).

Downlink data transmission in NR may start at the beginning of a slot or may start at a later position within the slot. Similarly, the data transmission may end before the end of the slot. This is sometimes referred to (not necessarily in a very careful manner) as "slot-based" and "mini-slot" or "non-slot-based" transmission, respectively. NR specifications include two different PDSCH mapping types, type A and type B. The difference between the two is the placement of the downlink demodulation reference signal (DM-RS).

In mapping type A, the DM-RS is placed at the beginning of the slot, either at the third or fourth orthogonal frequency division multiplexing (OFDM) symbol (signaled on the physical broadcast channel (PBCH)). In mapping type B, the DM-RS is placed at the beginning of the transmitted data. Thus, mapping type A is suitable for slot-based transmission and mapping type B may be used for non-slot-based transmission (although it in principle can be used for any transmission length).

A user equipment (UE) needs to know whether PDSCH mapping type A or B is used for a particular transmission. Current NR specifications and agreements do not specify how to indicate to the UE whether PDSCH mapping type A or B is used.

One possibility is semi-static configuration of the mapping type. For this to work, a default mapping type is defined and used for the initial configuration signaling form the network. Given NR agreements that system information can be transmitted using mini-slots, type B has to be the default.

Another possibility is to indicate in the downlink control information (DCI) the mapping type used. This approach may provide a large amount of flexibility at the cost of one DCI bit. As stated above, downlink data transmissions have some flexibility in the starting position in a slot, as well as the number of OFDM symbols used for the transmission. It has been agreed to signal the start and length through a table (i.e., the DCI contains an index which selects one of a plurality of entries in a (configurable) table). As an example, 3 bits may be used for the index giving 8 different possibilities of starting position/length for downlink data transmission.

Some proposals may include multiple time allocation tables, for example, one for slot-based transmission and one for non-slot-based transmission. In these proposals, the bit indicating PDSCH mapping type A or B may be used to select the time allocation table to use.

SUMMARY

As described above, separate signaling of type A/B and the time allocation index may lead to inflexible system operation. If a particular network deployment only uses one of the mapping types (e.g., A), then there is a cost of n bits in the downlink control information (DCI) but only n−1 of the bits is used to indicate the time allocation, essentially wasting one bit of DCI information.

According to some embodiments, a mapping type information (e.g., indication of physical downlink shared channel (PDSCH) mapping type A/B or other mapping type, such as for physical uplink shared channel (PUSCH)) is included in resource allocation information (or other system information) (e.g., a time allocation table or a time-domain resource allocation table).

According to some embodiments, a network node is configured to signal resource allocation information to a wireless device. The network node comprises a radio interface and processing circuitry configured to assemble radio resource allocation information for a wireless transmission. The radio resource allocation information comprises one or more time-domain resources for the wireless transmission and a mapping type for the wireless transmission. The mapping type refers to a reference signal placement within the wireless transmission. The radio interface and processing circuitry are further configured to transmit the radio resource allocation information to a wireless device.

In particular embodiments, the radio interface and processing circuitry are configured to transmit the radio resource allocation information to the wireless device by transmitting DCI to the wireless device. The DCI comprises an index that identifies a particular radio resource allocation information of a predefined set of radio resource allocation information.

According to some embodiments, a method performed by a network node for signaling resource allocation information to a wireless device comprises assembling radio resource allocation information for a wireless transmission. The radio resource allocation information comprises one or more time-domain resources for the wireless transmission and a mapping type for the wireless transmission. The mapping type refers to a reference signal placement within the wireless transmission. The method further comprises transmitting the radio resource allocation information to a wireless device.

In particular embodiments, transmitting the radio resource allocation information to the wireless device comprises transmitting DCI to the wireless device. The DCI comprises an index that identifies a particular radio resource allocation information of a predefined set of radio resource allocation information.

According to some embodiments, a wireless device is configured to receive resource allocation information from a network node. The wireless device comprises a radio interface and processing circuitry configured to receive radio resource allocation information for a wireless transmission. The radio resource allocation information comprises one or more time-domain resources for the wireless transmission and a mapping type for the wireless transmission. The mapping type refers to a reference signal placement within the wireless transmission. The radio interface and processing circuitry are further configured to interpret the received radio resource allocation information to determine a mapping type for the wireless transmission.

In particular embodiments, the radio interface and processing circuitry are configured to determine the mapping type based on the one or more time-domain resources for the wireless transmission.

In particular embodiments, the radio interface and processing circuitry receive the radio resource allocation information by receiving DCI from the network node. The DCI comprises an index that identifies a particular radio resource allocation information of a predefined set of radio resource allocation information. The radio interface and processing circuitry are configured to interpret the received radio resource allocation information by using the index to determine the particular radio resource allocation information and determine the mapping type using the particular radio resource allocation information.

According to some embodiments, a method in a wireless device for receiving resource allocation information from a network node comprises receiving radio resource allocation information for a wireless transmission. The radio resource allocation information comprises one or more time-domain resources for the wireless transmission and a mapping type for the wireless transmission. The mapping type refers to a reference signal placement within the wireless transmission. The method further comprises interpreting the received radio resource allocation information to determine a mapping type for the wireless transmission.

In particular embodiments, determining the mapping type is based on the one or more time-domain resources for the wireless transmission.

In particular embodiments, receiving the radio resource allocation information comprises receiving DCI from the network node. The DCI comprises an index that identifies a particular radio resource allocation information of a predefined set of radio resource allocation information. Interpreting the received radio resource allocation information comprises using the index to determine the particular radio resource allocation information and determine the mapping type using the particular radio resource allocation information.

In particular embodiments, the mapping type comprises one of mapping type A or mapping type B. Mapping type A refers to a demodulation reference signal (DMRS) placed relative to the beginning of a slot, and mapping type B refers to a DMRS placed at the beginning of transmitted data within a slot. The mapping type may be associated with PDSCH or PUSCH.

In particular embodiments, the one or more time-domain resources for the wireless transmission comprise at least one of a starting orthogonal division frequency multiplexing (OFDM) symbol for the wireless transmission and a duration of the wireless transmission. The duration of the wireless transmission may be specified by one of a number of OFDM symbols for the wireless transmission or an ending OFDM symbol.

In particular embodiments, the mapping type is implicitly determined based on the one or more time-domain resources for the wireless transmission.

According to some embodiments, a network node is configured to signal resource allocation information to a wireless device. The network node comprises a resource allocation module and a radio interface module. The resource allocation module is operable to assemble radio resource allocation information for a wireless transmission. The radio resource allocation information comprising one or more time-domain resources for the wireless transmission and a mapping type for the wireless transmission. The mapping type refers to a reference signal placement within the wireless transmission. The radio interface module is operable to transmit the radio resource allocation information to a wireless device.

According to some embodiments, a wireless device is configured to receive resource allocation information from a network node. The wireless device comprises a radio interface module and a resource interpreter module. The radio interface module is operable to receive radio resource allocation information for a wireless transmission. The radio resource allocation information comprises one or more time-domain resources for the wireless transmission and a mapping type for the wireless transmission. The mapping type refers to a reference signal placement within the wireless transmission. The resource interpreter module is operable to interpret the received radio resource allocation information to determine a mapping type for the wireless transmission.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantage(s). Particular embodiments provide for signaling mapping type information, such as for PDSCH, PUSCH or other mapping type.

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 is a flowchart of an example process in a network node for generating and signaling a resource allocation information (or other system information) according to some embodiments.

DETAILED DESCRIPTION

Figure 1:
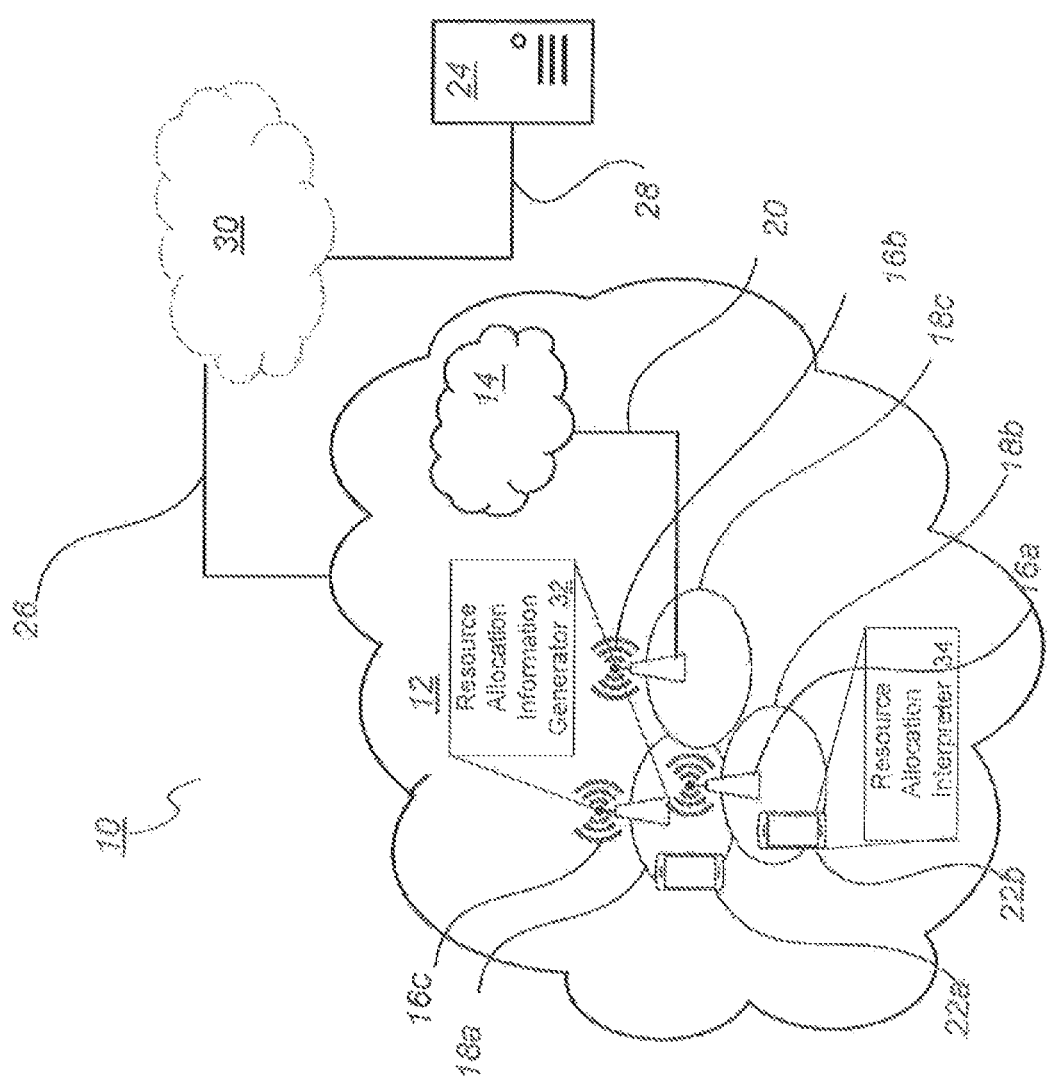
FIG. 1 is a schematic diagram of an example network architecture illustrating a telecommunication network connected via an intermediate network to a host computer, according to some embodiments.

As described above, certain challenges currently exist with signaling mapping type information in Third Generation Partnership Project (3GPP) fifth generation (5G) new radio (NR). For example, separate signaling of physical downlink shared channel (PDSCH) type A/B and the time allocation index may lead to inflexible system operation. If a particular network deployment uses only one of the mapping types (e.g., A), then there is a cost of n bits in the downlink control information (DCI) but only n−1 of the bits may be used to indicate the time allocation, essentially wasting one bit of DCI information.

According to some embodiments, a mapping type information (e.g., indication PDSCH mapping type A/B or other mapping type, such as for physical uplink shared channel (PUSCH)) is included in resource allocation information (or other system information) (e.g., a time allocation table or a time-domain resource allocation table). Some embodiments include methods, wireless devices and network nodes for signaling mapping type information together with resource allocation information, rather than separately.

Before describing particular embodiments in detail, generally the embodiments reside primarily in combinations of apparatus components and processing steps related to methods and apparatuses for signaling of a mapping type. Accordingly, components are represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for describing particular embodiments only and is not intended limit the concepts described herein.

As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible to achieve the electrical and data communication.

In some embodiments described herein, the term "coupled," "connected," and the like, may be used to indicate a connection, although not necessarily directly, and may include wired and/or a wireless connection.

The term "network node" may be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals. The WD may also be a radio communication device, target device, device to device (D2D) WD, machine type WD or WI) capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Certain embodiments provide methods, wireless devices and network nodes for methods and apparatuses for signaling of mapping type information, such as PDSCH mapping type. According to some embodiments disclosed herein, indication of the PDSCH mapping type A/B is included in the time allocation table or a time-domain resource allocation table.

Returning to the drawing figures, in which like elements are referred to by like reference numerals, there is shown in FIG. 1 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20.

A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD 22 is in the coverage area or where a sole WD is connecting to the corresponding network node 16. Note that although only two WDs 22 and three network nodes 16 are shown for convenience, the communication system may include many more WDs 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a resource allocation information (or other system information) generator 32, which is configured to generate a resource allocation information (or other system information), including mapping type information. Alternatively (not shown), mapping type information may be included in resource allocation information (or other system information) not at the network node but elsewhere, and the combined system information may be provided to the network node 16. A wireless device 22 is configured to include a resource allocation information (or other system information) interpreter 34, which is configured to interpret resource allocation information (or other system information) received from the network node 16.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

Thus, the host computer 24 may further comprise software (SW) 48, which is stored in, for example, memory 46 at the host computer 24, or stored in external memory (e.g., database) accessible by the host computer 24. The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. In one embodiment, the host computer 24 may be configured for providing control and functionality to a service provider and may be operated by the service provider or on behalf of the service provider. The processing circuitry 42 of the host computer 24 may be configured to enable the service provider to observe functionality of and process data from the network node 16 and/or the wireless device 22.

The communication system 10 further includes a network node 16 provided in a telecommunication system 10 and comprising hardware 54 enabling it to communicate with the host computer 24 and with the WD 22. The hardware 54 may include a communication interface 56 for setting up and maintaining a wired or wireless connection with an interface of a different communication device of the communication system 10, as well as a radio interface 58 for setting up and maintaining at least a wireless connection 60 with a WD 22 located in a coverage area 18 served by the network node 16. The radio interface 58 may be formed as or may include, for example, one or more RF transmitters, one or more RF receivers, and/or one or more RF transceivers. The communication interface 56 may be configured to facilitate a connection 61 to the host computer 24. The connection 61 may be direct or it may pass through a core network 14 of the telecommunication system 10 and/or through one or more intermediate networks 30 outside the telecommunication system 10.

In the embodiment shown, the hardware 54 of the network node 16 further includes processing circuitry 62. The processing circuitry 62 may include a processor 64 and a memory 66. In particular, in addition to a traditional processor and memory, the processing circuitry 62 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 64 may be configured to access (e.g., write to and/or read from) the memory 66, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 94 stored internally in, for example, memory 66 or stored in external memory (e.g., database) accessible by the network node 16 via an external connection. The software 68 may be executable by the processing circuitry 62. The processing circuitry 62 may be configured to control any of the methods and/or processes described herein and/or to cause such methods, and/or processes to be performed, e.g., by network node 16. Processor 64 corresponds to one or more processors 64 for performing network node 16 functions described herein. The memory 68 is configured to store data, programmatic software code and/or other information described herein. In some embodiments, the software 68 may include instructions that, when executed by the processor 64 and/or processing circuitry 62, causes the processor 64 and/or processing circuitry 62 to perform the processes described herein with respect to network node 16. For example, processing circuitry 62 of the network node 16 may include a port index generator 32 to generate a port index indication.

The communication system 10 further includes the WD 22 already referred to. The WD 22 may have hardware 70 that may include a radio interface 72 configured to set up and maintain a wireless connection 60 with a network, node 16 serving a coverage area 18 in which the WD 22 is currently located. The radio interface 72 may be formed as or may include, for example, one or more RF transmitters, one or more RF receivers, and/or one or more RF transceivers.

The hardware 70 of the WD 22 further includes processing circuitry 74. The processing circuitry 74 may include a processor 76 and memory 78. In particular, in addition to a traditional processor and memory, the processing circuitry 74 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 76 may be configured to access (e.g., write to and/or read from) memory 78, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 further comprises software 80, which is stored in, for example, memory 78 at the WD 22, or stored in external memory (e.g., database) accessible by the WD 22. The software 80 may be executable by the processing circuitry 74. The software 80 includes a client application 82. The client application 82 may be operable to provide a service to a human or non-human user via the WD 22, with the support of the host computer 24. In the host computer 24, an executing host application 50 may communicate with the executing client application 82 via the OTT connection 52 terminating at the WD 22 and the host computer 24. In providing the service to the user, the client application 82 may receive request data from the host application 50 and provide user data in response to the request data. The OTT connection 52 may transfer both the request data and the user data. The client application 82 may interact with the user to generate the user data that it provides.

Processing circuitry 74 may be configured to control any of the methods and/or processes described herein and/or to cause such methods, and/or processes to be performed, e.g., by WD 22. Processor 108 corresponds to one or more processors 76 for performing WD 22 functions described herein. The WD 22 includes memory 78 that is configured to store data, programmatic software code and/or other information described herein. In some embodiments, the software 80 and/or the client application 82 may include instructions that, when executed by the processor 76 and/or processing circuitry 74, causes the processor 76 and/or processing circuitry 74 to perform the processes described herein with respect to WD 22. For example, the processing circuitry 74 of the wireless device 22 may be configured to implement a resource allocation information (or other system information) interpreter 34 to interpret (process) resource allocation information (or other system information).

Embodiments discussed herein provide methods and apparatuses that may allow for a system with improved efficiency. According to some embodiments, the resource allocation information (or other system information) may be a time allocation table or a time-domain resource allocation table. According to some embodiments, the resource allocation information (or other system information) may be Downlink Control Information (DCI). The mapping type information may comprise information indicating PDSCH mapping type A or B.

According to some embodiments, the PDSCH mapping type (A or B) is part of a time allocation table. The table may be partially or fully configurable, but at least one entry has a default configuration for the system to be able to transmit configuration information to a wireless device, such as WD 22. This is true in general and not related to the mapping type only.

According to some embodiments, upon reception of a DCI, WD 22 interprets the information by using the time allocation field of size n bits as a pointer into the table to get the time allocation information, the mapping type, and possibly other information.

An example of such a table is shown below with the mapping type in the last column. As an alternative to providing the transmission length, the end position of the transmission may be provided.

In one embodiment, the mapping type is explicitly configured (or specified) in the table. In another embodiment, the mapping type may be derived from the time allocation. For example, all time allocations starting later than a certain OFDM symbol number would correspond to mapping type B, while allocations starting earlier that this OFDM symbol would use allocation type A. This would reduce the amount of configuration information slightly at the cost of reduced flexibility.

In some embodiments, depending on the PDSCH mapping type, the start (and end field if present) field may be absolute or relative. An absolute indication provides the starting symbol as symbol number within a slot, while a relative indication is relative to the scheduling PDCCH/CORESET. Absolute indication may be more suitable for Type A while relative indication may be more suitable for Type B In principle, absolute and relative indications may be configured individually for each table entry (or linked to the A/B mapping). All entries may also be specified with respect to same scheme, i.e. either absolute or relative.

In the example of Table 1 below, Index 0 and 1 refer to Type A mapping (complete slot and almost complete slot with late start). The last two rows refer to Type B mapping. All entries assume absolute time indication.

TABLE 1

| Index | Starting OFDM symbol | Length in OFDM symbols | PDSCH mapping type A or B |
|---|---|---|---|
| 0 | 0 | 14 | Type A |
| 1 | 3 | 11 | Type A |
| 2 | 5 | 6 | Type B |
| 3 | 9 | 10 | Type B |
| ... | | | |

Another example is shown in Table 2 below where the Type B mapping assumes relative time indication. The starting OFDM symbol is therefore relative to the PDCCH/COREST symbol.

TABLE 2

| Index | Starting OFDM symbol | Length in OFDM symbols | PDSCH mapping type A or B |
|---|---|---|---|
| 0 | 0 | 14 | Type A |
| 1 | 3 | 11 | Type A |
| 2 | 0 | 2 | Type B |
| 3 | 0 | 4 | Type B |
| ... | | | |

Figure 2:
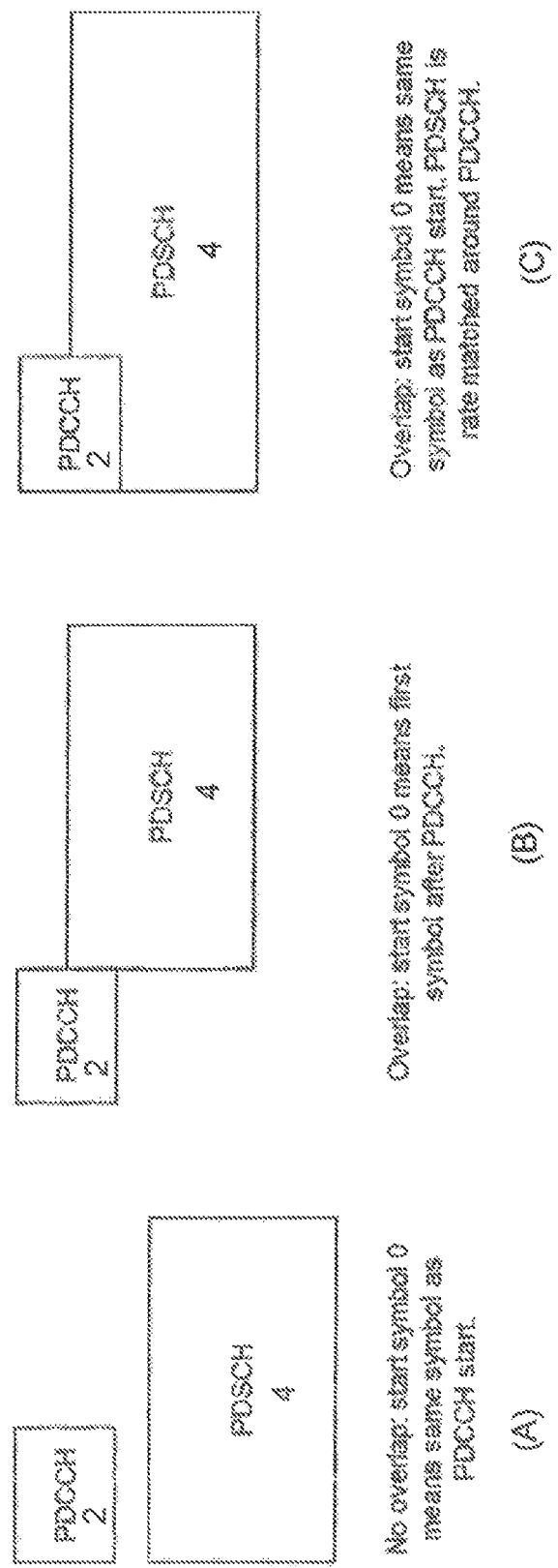
FIG. 2 is a block diagram illustrating three examples of a PDSCH start value relative to a PDCCH/CORESET.

For downlink, depending how PDCCH/CORSET and PDSCH overlap, a relative start value can be interpreted differently. An NR specification may define how to handle the overlap case. FIG. 2 illustrates some examples.

FIG. 2 is a block diagram illustrating three examples of a PDSCH start value relative to a PDCCH/CORESET. Example (A) does not include overlap. Starting symbol 0 means that the starting symbol for PDSCH 4 is the same symbol as the starting symbol for PSCCH 2. Example (B) includes overlap. Starting symbol 0 means that the starting symbol for PDSCH 4 is the first symbol after PDCCH 2. Example (C) also includes overlap. Starting symbol 0 means that the starting symbol for PDSCH 4 is the same symbol as the starting symbol for PSCCH 2, and PDSCH 4 is rate matched around PDCCH 2.

Particular embodiments may include mapping type information in a resource allocation information (or other system information). Some embodiments use mapping type information included in a resource allocation information (or other system information). Some embodiments facilitate improved radio system efficiency.

Although some embodiments of this disclosure have been described from a downlink perspective (e.g., PDSCH), the same approach can be applied to uplink transmissions (e.g., PUSCH) where multiple mapping types also are present.

Although some embodiments of this disclosure describe including mapping type information in a resource allocation information (or other system information), mapping type information may be transmitted together with resource allocation information (e.g., time index in time allocation table) in alternate ways.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Figure 3:
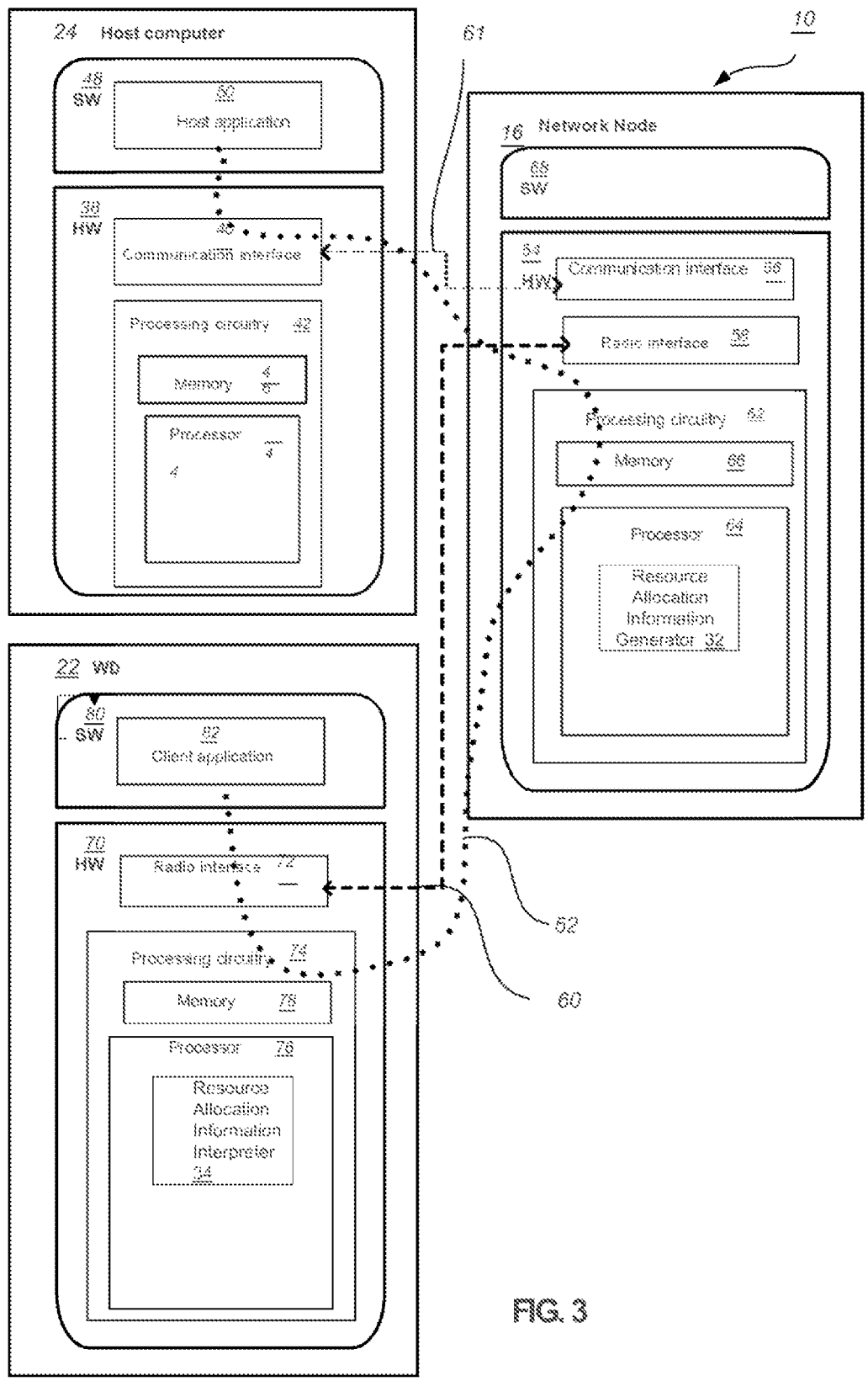
FIG. 3 is a block diagram of a host computer communicating via a network node with a wireless device over an at least partially wireless connection according to some embodiments.

In some embodiments, the inner workings of the network node 16, WD 22, and host computer 24 may be as shown in FIG. 3 and independently, the surrounding network topology may be that of FIG. 1.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 60 between the WD 22 and the network node 16 is in accordance with the teachings of the embodiments described throughout this disclosure. One or more of the various embodiments improve the performance of OTT services provided to the WD 22 using the OTT connection 52, in which the wireless connection 60 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 80 of the WD 22, or both. In embodiments, sensors (not shown) may be deployed in or in association with communication devices through which the OTT connection 52 passes; the sensors may participate in the measurement procedure by supplying values of the monitored quantities exemplified above or supplying values of other physical quantities from which software 48, 80 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD 22 signaling facilitating the host computer's 24 measurements of throughput, propagation times, latency and the like. In some embodiments, the measurements may be implemented in that the software 48, 80 causes messages to be transmitted, in particular empty or 'dummy' messages, using the OTT connection 52 while it monitors propagation times, errors etc.

Figure 4:
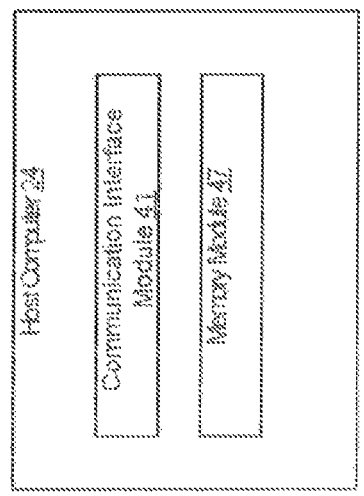
FIG. 4 is a block diagram of an alternative embodiment of a network node, according to some embodiments.

FIG. 4 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 5:
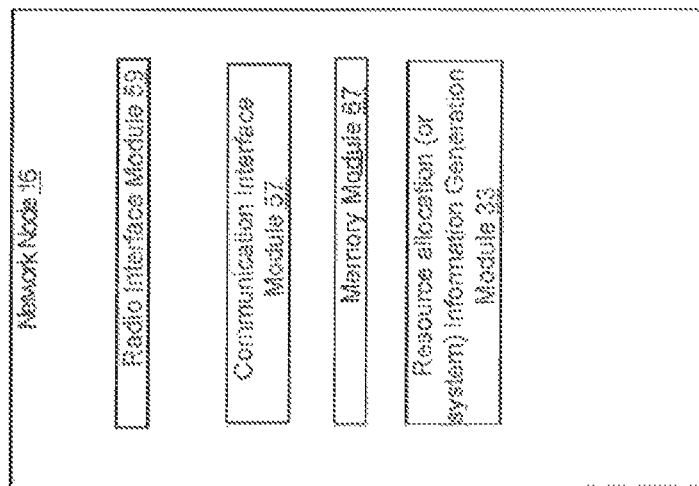
FIG. 5 is a block diagram of an alternative embodiment of a wireless device, according to some embodiments.

FIG. 5 is a block diagram of an alternative network node 16, which may be implemented at least in part by software modules containing software executable by a processor to perform the functions described herein. The network node 16 includes a radio interface module 59 configured for setting up and maintaining at least a wireless connection 60 with a WD 22 located in a coverage area 18 served by the network node 16. The network node 16 also includes a communication interface module 57 configured for setting up and maintaining a wired or wireless connection with an interface of a different communication device of the communication system 10. The communication interface module 57 may alsd be configured to facilitate a connection 54 to the host computer 24. The memory module 67 that is configured to store data, programmatic software code and/or other information described herein. The resource allocation information (or other system information) generation module 33 is configured to generate a resource allocation information (or other system information).

Figure 6:
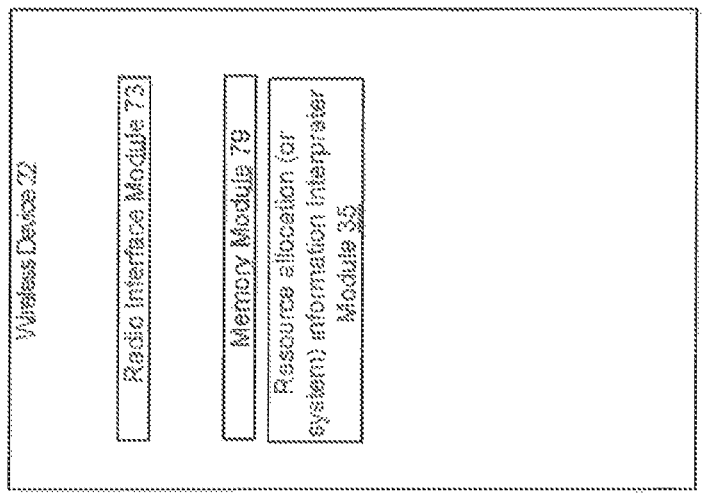
FIG. 6 is a block diagram of an alternative embodiment of a host computer, according to some embodiments.

FIG. 6 is a block diagram of an alternative wireless device 22, which may be implemented at least in part by software modules containing software executable by a processor to perform the functions described herein. The WD 22 includes a radio interface module 73 configured to set up and maintain a wireless connection 60 with a network node 16 serving a coverage area 18 in which the WI 22 is currently located. The memory module 79 is configured to store data, programmatic software code and/or other information described herein. The resource allocation information (or other system information) interpreter module 35 is configured to interpret (process) resource allocation information (or other system information). The interpretation may comprise interpreting mapping information included in (or transmitted together with, by the network node 16) the resource allocation information (or other system information).

Figure 7:
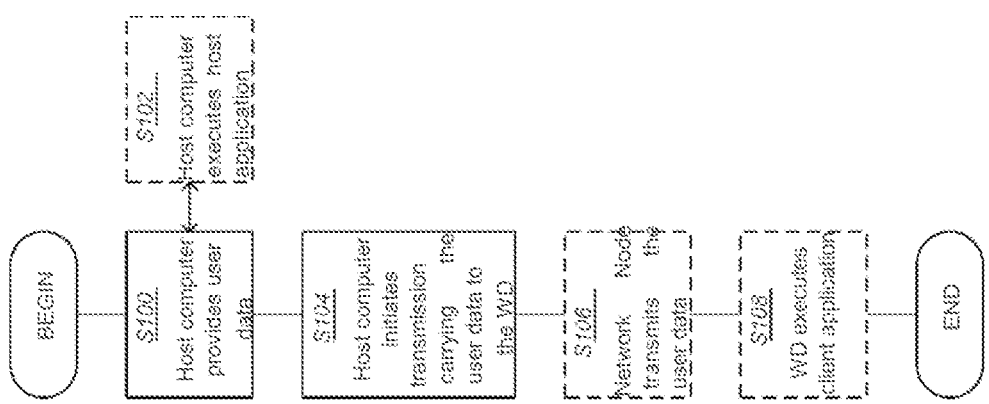

FIG. 7 is a flowchart illustrating an example method implemented in a communication system, such as, for example, the communication system of FIG. 1, in accordance with one embodiment. The communication system may include a host computer 24, a network node 16 and a WD 22, which may be those described with reference to FIG. 1.

In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 22 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

Figure 8:
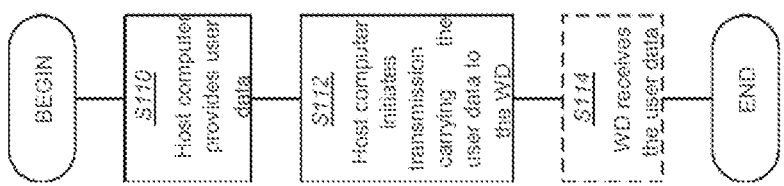
FIGS. 7-10 are flow charts illustrating example methods implemented in a communication system including a host computer, a network node and a wireless device, according to some embodiments.

FIG. 8 is a flowchart illustrating an example method implemented in a communication system, such as, for example, the communication system of FIG. 1, in accordance with one embodiment. The communication system may include a host computer 24, a network node 16 and a WD 22, which may be those described with reference to FIG. 1.

In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 9:
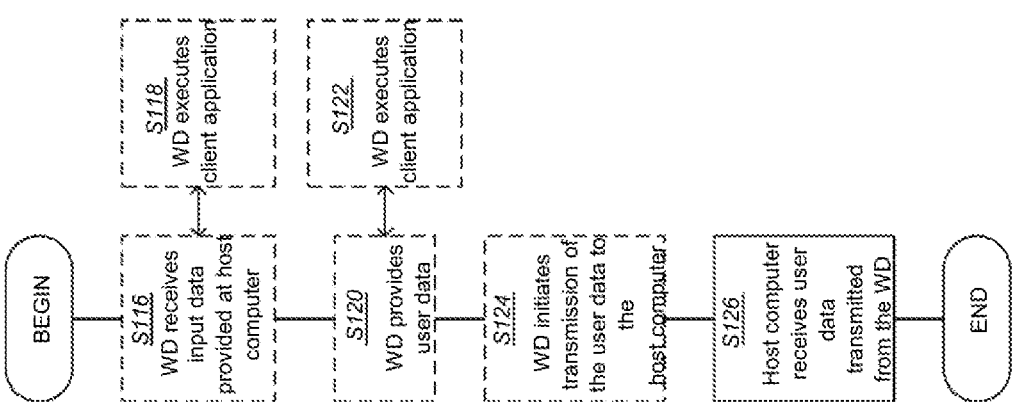

FIG. 9 is a flowchart illustrating an example method implemented in a communication system, such as, for example, the communication system of FIG. 1, in accordance with one embodiment. The communication system may include a host computer 24, a network node 16 and a WD 22, which may be those described with reference to FIG. 1.

In an optional first step of the method, the WD 22 receives input data provided by the host computer 24 (block S116) Additionally or alternatively, in an optional second step, the WD 22 provides user data (block S120). In an optional substep of the second step, the WD provides the user data by executing a client application, such as, for example, client application 114 (block S118). In a further optional substep of the first step, the WD 22 executes the client application 114, which provides the user data in reaction to the received input data provided by the host computer 24 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 10:
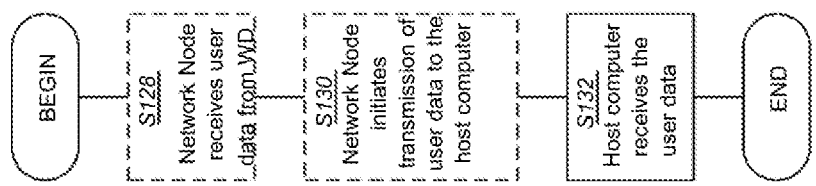

FIG. 10 is a flowchart illustrating an example method implemented in a communication system, such as, for example, the communication system of FIG. 1, in accordance with one embodiment. The communication system may include a host computer 24, a network node 16 and a WD 22, which may be those described with reference to FIG. 1. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data earned in the transmission initiated by the network node 16 (block S132).

FIG. 11 is a flowchart of an exemplary process in a network node 16 for generating and signaling a port index indication according to some embodiments of the present disclosure. The process includes including, via the resource allocation information (or other system information) generator 32, a mapping type information in a resource allocation information (or other system information) (block S134).

For example, network node 16 may assemble radio resource allocation information for a wireless transmission. The radio resource allocation information comprises one or more time-domain resources for the wireless transmission and a mapping type for the wireless transmission. The mapping type refers to a reference signal placement within the wireless transmission.

The mapping type may comprise one of mapping type A or mapping type B. Mapping type A refers to a DMRS placed at the beginning of a slot, and mapping type B refers to a DMRS placed at the beginning of transmitted data within a slot. The mapping type may be associated with a PDSCH or PUSCH.

The one or more time-domain resources for the wireless transmission may comprise one of a starting OFDM symbol for the wireless transmission and a duration of the wireless transmission. The duration of the wireless transmission may be specified by one of a number of OFDM symbols for the wireless transmission or an ending OFDM symbol.

The process also includes signaling, via the radio interface 58, the resource allocation information (or other system information) to a wireless device (block S136). For example, network node 16 may transmit the radio resource allocation information to wireless device 22, In some embodiments, the network node may transmit DCI to the wireless device. The DCI may comprise an index that identifies a particular radio resource allocation information of a predefined set radio resource allocation information (e.g., Tables 1 and 2 described above).

Modifications, additions, or omissions may be made to the method of FIG. 11. Additionally, one or more steps in the method of FIG. 11 may be performed in parallel or in any suitable order.

Figure 12:
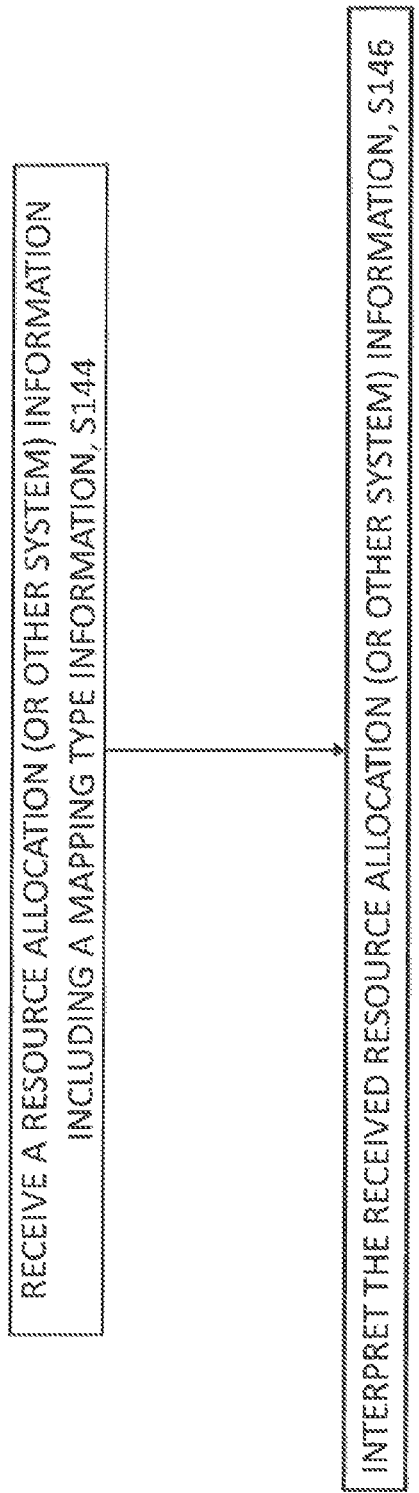
FIG. 12 is a flowchart of an example process in a wireless device for receiving and processing a resource allocation information (or other system information) according to some embodiments.

FIG. 12 is a flowchart of an example process in a wireless device 22 for receiving and processing (or interpreting) a resource allocation information (or other system information) according to some embodiments of the present disclosure. The process includes receiving, via the radio interface 72, a resource allocation information (or other system information) including mapping type information from a network node 16 (block S144).

For example, wireless device 22 may receive radio resource allocation information for a wireless transmission. The radio resource allocation information comprises one or more time-domain resources for the wireless transmission and a mapping type for the wireless transmission. The mapping type refers to a reference signal placement within the wireless transmission.

The mapping type may comprise one of mapping type A or mapping type B. Mapping type A refers to a DMRS placed at the beginning of a slot, and mapping type B refers to a DMRS placed at the beginning of transmitted data within a slot. The mapping type may be associated with a PDSCH or PUSCH.

The one or more time-domain resources for the wireless transmission may comprise one of a starting OFDM symbol for the wireless transmission and a duration of the wireless transmission. The duration of the wireless transmission may be specified by one of a number of OFDM symbols for the wireless transmission or an ending OFDM symbol.

The process also includes interpreting, via the resource allocation information (or other system information) interpreter 34, interpreting the resource allocation information (or other system information) (block S146). The interpretation may comprise interpreting mapping information included in (or transmitted together) the resource allocation information (or other system information).

For example, wireless device 22 may interpret the received radio resource allocation information to determine a mapping type for the wireless transmission. The wireless device may receive DCI from the network node. The DCI may comprise an index that identifies a particular radio resource allocation information of a predefined set radio resource allocation information. The wireless device may be configured to interpret the received radio resource allocation information by using the index to determine the particular radio resource allocation information and determine the mapping type using the particular radio resource allocation information.

Modifications, additions, or omissions may be made to the method of FIG. 12. Additionally, one or more steps in the method of FIG. 12 may be performed in parallel or in any suitable order.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
CRC Cyclic Redundancy Check
C-RNTI Cell RNTI
CSI Channel State Information
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
ETWS Earthquake and Tsunami Warning System
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HF High Frequency/High Frequencies
HO Handover
HSPA High Speed Packet Access
HRPD High Rate Packet Data
IMSI International Mobile Subscriber Identity
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PI Paging Indicator
PO Paging Occasion
PRACH Physical Random Access Channel
P-RNTI Paging RNTI
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAR Random Access Response
RA-RNTI Random Access RNTI
RNA RAN Notification Area
RNTI Radio Network Temporary Identifier
RAT Radio Access Technology
RLM Radio Link Management
RNC Radio Network Controller RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SAE System Architecture Evolution
SCH Synchronization Channel
SCell Secondary Cell
SDU Service Data Unit
SFN System Frame Number or Single Frequency Network
SGW Serving Gateway
SI System Information
SIB System Information Block
SNR Signal to Noise Ratio
SON Self Optimized Network
SS Synchronization Signal
SSS Secondary Synchronization Signal
S-TMSI SAE-TMSI
TDD Time Division Duplex
TDOA Time Difference of Arrival
TMSI Temporary Mobile Subscriber Identity
TRP Transmission/Reception Point
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A network node configured to signal resource allocation information to a wireless device, the network node comprising a radio interface and processing circuitry configured to:
assemble radio resource allocation information for a wireless transmission, the radio resource allocation information indicating one or more time-domain resources for the wireless transmission and a mapping type for the wireless transmission, wherein the mapping type refers to a reference signal placement within the wireless transmission; and
transmit the radio resource allocation information to a wireless device by transmitting downlink control information (DCI) to the wireless device, the DCI comprising an index that identifies a particular radio resource allocation information of a predefined set of radio resource allocation information.

2. The network node of claim 1, wherein the mapping type comprises one of mapping type A or mapping type B, wherein mapping type A refers to a demodulation reference signal (DMRS) placed relative to the beginning of a slot, and mapping type B refers to a DMRS placed at the beginning of transmitted data within a slot.

3. The network node of claim 1, wherein the mapping type is associated with a physical downlink shared channel (PDSCH).

4. The network node of claim 1, wherein the mapping type is associated with a physical uplink shared channel (PUSCH).

5. The network node of claim 1, wherein the one or more time-domain resources for the wireless transmission comprise at least one of a starting orthogonal division frequency multiplexing (OFDM) symbol for the wireless transmission and a duration of the wireless transmission.

6. The network node of claim 5, wherein the duration of the wireless transmission is specified by one of a number of OFDM symbols for the wireless transmission or an ending OFDM symbol.

7. The network node of claim 1, wherein the mapping type is implicitly determined based on the one or more time-domain resources for the wireless transmission.

8. A method performed by a network node for signaling resource allocation information to a wireless device, the method comprising:
assembling radio resource allocation information for a wireless transmission, the radio resource allocation information indicating one or more time-domain resources for the wireless transmission and a mapping type for the wireless transmission, wherein the mapping type refers to a reference signal placement within the wireless transmission; and
transmitting the radio resource allocation information to a wireless device, wherein transmitting the radio resource allocation information to the wireless device comprises transmitting downlink control information (DCI) to the wireless device, the DCI comprising an index that identifies a particular radio resource allocation information of a predefined set of radio resource allocation information.

9. The method of claim 8, wherein the mapping type comprises one of mapping type A or mapping type B, wherein mapping type A refers to a demodulation reference signal (DMRS) placed relative to the beginning of a slot, and mapping type B refers to a DMRS placed at the beginning of transmitted data within a slot.

10. The method of claim 8, wherein the mapping type is associated with a physical downlink shared channel (PDSCH).

11. The method of claim 8, wherein the mapping type is associated with a physical uplink shared channel (PUSCH).

12. The method of claim 8, wherein the one or more time-domain resources for the wireless transmission comprise at least one of a starting orthogonal division frequency multiplexing (OFDM) symbol for the wireless transmission and a duration of the wireless transmission.

13. The method of claim 12, wherein the duration of the wireless transmission is specified by one of a number of OFDM symbols for the wireless transmission or an ending OFDM symbol.

14. The method of claim 8, wherein the mapping type is implicitly determined based on the one or more time-domain resources for the wireless transmission.

15. A wireless device configured to receive resource allocation information from a network node, the wireless device comprising a radio interface and processing circuitry configured to:
receive radio resource allocation information for a wireless transmission, the radio resource allocation information indicating one or more time-domain resources for the wireless transmission and a mapping type for the wireless transmission, wherein the mapping type refers to a reference signal placement within the wireless transmission; and interpret the received radio resource allocation information to determine a mapping type for the wireless transmission;

wherein the radio interface and processing circuitry are configured to receive the radio resource allocation information by receiving downlink control information (DCI) from the network node, the DCI comprising an index that identifies a particular radio resource allocation information of a predefined set of radio resource allocation information, and wherein the radio interface and processing circuitry are configured to interpret the received radio resource allocation information by using the index to determine the particular radio resource allocation information and determine the mapping type using the particular radio resource allocation information.

16. The wireless device of claim 1, wherein the mapping type comprises one of mapping type A or mapping type B, wherein mapping type A refers to a demodulation reference signal (DMRS) placed relative to the beginning of a slot, and mapping type B refers to a DMRS placed at the beginning of transmitted data within a slot.

17. The wireless device of claim 15, wherein the mapping type is associated with a physical downlink shared channel (PDSCH).

18. The wireless device of claim 15, wherein the mapping type is associated with a physical uplink shared channel (PUSCH).

19. The wireless device of claim 15, wherein the one or more time-domain resources for the wireless transmission comprise at least one of a starting orthogonal division frequency multiplexing (OFDM) symbol for the wireless transmission and a duration of the wireless transmission.

20. The wireless device of claim 19, wherein the duration of the wireless transmission is specified by one of a number of OFDM symbols for the wireless transmission or an ending OFDM symbol.

21. The wireless device of claim 15, wherein the radio interface and processing circuitry are configured to determine the mapping type based on the one or more time-domain resources for the wireless transmission.

22. A method in a wireless device for receiving resource allocation information from a network node, the method comprising:

receiving radio resource allocation information for a wireless transmission, the radio resource allocation information indicating one or more time-domain resources for the wireless transmission and a mapping type for the wireless transmission, wherein the mapping type refers to a reference signal placement within the wireless transmission; and interpreting the received radio resource allocation information to determine a mapping type for the wireless transmission;

wherein receiving the radio resource allocation information comprises receiving downlink control information (DCI) from the network node, the DCI comprising an index that identifies a particular radio resource allocation information of a predefined set of radio resource allocation information, and wherein interpreting the received radio resource allocation information comprises using the index to determine the particular radio resource allocation information and determine the mapping type using the particular radio resource allocation information.

23. The method of claim 22, wherein the mapping type comprises one of mapping type A or mapping type B, wherein mapping type A refers to a demodulation reference signal (DMRS) placed relative to the beginning of a slot, and mapping type B refers to a DMRS placed at the beginning of transmitted data within a slot.

24. The method of claim 22, wherein the mapping type is associated with a physical downlink shared channel (PDSCH).

25. The method of claim 22, wherein the mapping type is associated with a physical uplink shared channel (PUSCH).

26. The method of claim 22, wherein the one or more time-domain resources for the wireless transmission comprise at least one of a starting orthogonal division frequency multiplexing (OFDM) symbol for the wireless transmission and a duration of the wireless transmission.

27. The method of claim 26, wherein the duration of the wireless transmission is specified by one of a number of OFDM symbols for the wireless transmission or an ending OFDM symbol.

* * * * *

UNITED STATES PATENT AND TRADEMARK OFFICE
CERTIFICATE OF CORRECTION

PATENT NO. : 10,701,682 B2  
APPLICATION NO. : 16/441216  
DATED : June 30, 2020  
INVENTOR(S) : Parkvall et al.

Page 1 of 2

It is certified that error appears in the above-identified patent and that said Letters Patent is hereby corrected as shown below:

In the Specification

In Column 1, Line 7, delete "16/274,531" and insert -- 16/274,531 filed Feb. 13, 2019, now abandoned, --, therefor.

In Column 1, Line 59, delete "carefild" and insert -- careful --, therefor.

In Column 2, Line 4, delete "(although it in principle can" and insert -- (although in principle it can --, therefor.

In Column 4, Lines 16-17, delete "orthogonal division frequency multiplexing (OFDM)" and insert -- orthogonal frequency division multiplexing (OFDM) --, therefor.

In Column 6, Line 61, delete "WI) capable" and insert -- WD capable --, therefor.

In Column 10, Line 34, delete "network," and insert -- network --, therefor.

In Column 11, Line 23, delete "fbr" and insert -- for --, therefor.

In Column 11, Line 64, delete "Type B In" and insert -- Type B. In --, therefor.

In Column 14, Line 23, delete "may alsd" and insert -- may also --, therefor.

In Column 14, Line 36, delete "WI 22" and insert -- WD 22 --, therefor.

In Column 15, Line 27, delete "(block S116)" and insert -- (block S116). --, therefor.

In Column 15, Line 57, delete "earned" and insert -- carried --, therefor.

In Column 16, Line 22, delete "device 22," and insert -- device 22. --, therefor.

Signed and Sealed this  
Fifth Day of January, 2021

Andrei Iancu  
*Director of the United States Patent and Trademark Office*

In the Claims

In Column 22, Lines 9-10, in Claim 5, delete "orthogonal division frequency multiplexing (OFDM)" and insert -- orthogonal frequency division multiplexing (OFDM) --, therefor.

In Column 22, Lines 50-51, in Claim 12, delete "orthogonal division frequency multiplexing (OFDM)" and insert -- orthogonal frequency division multiplexing (OFDM) --, therefor.

In Column 23, Lines 35-36, in Claim 19, delete "orthogonal division frequency multiplexing (OFDM)" and insert -- orthogonal frequency division multiplexing (OFDM) --, therefor.

In Column 24, Lines 37-38, in Claim 26, delete "orthogonal division frequency multiplexing (OFDM)" and insert -- orthogonal frequency division multiplexing (OFDM) --, therefor.